United States Patent
Savchenkov et al.

(10) Patent No.: US 6,901,189 B1
(45) Date of Patent: May 31, 2005

(54) GRADED-INDEX WHISPERING GALLERY MODE RESONATORS

(75) Inventors: Anatoliy Savchenkov, La Crescenta, CA (US); Lutfollah Maleki, Pasadena, CA (US); Vladimir Ilchenko, La Canada, CA (US); Andrey B. Matsko, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 31 days.

(21) Appl. No.: 10/438,668

(22) Filed: May 14, 2003

Related U.S. Application Data (60) Provisional application No. 60/381,622, filed on May 17, 2002.

(51) Int. Cl.[7] ................................................ G02B 6/26
(52) U.S. Cl. ........................ 385/39; 385/27; 385/30; 385/24
(58) Field of Search ........................ 385/27, 15, 14, 385/11, 30, 39, 24, 16, 48; 372/39, 94; 435/6

(56) References Cited

U.S. PATENT DOCUMENTS

| | | | | |
|---|---|---|---|---|
| 5,343,490 A | * | 8/1994 | McCall | 372/94 |
| 5,790,583 A | * | 8/1998 | Ho | 372/92 |
| 6,775,448 B2 | * | 8/2004 | Zoorob | 385/122 |
| 2003/0021518 A1 | * | 1/2003 | Smirnov et al. | 385/15 |
| 2003/0231826 A1 | * | 12/2003 | Boyd et al. | 385/27 |
| 2004/0017834 A1 | * | 1/2004 | Sundar et al. | 372/39 |
| 2004/0137478 A1 | * | 7/2004 | Arnold et al. | 435/6 |

* cited by examiner

*Primary Examiner*—Fayez G. Assaf
(74) *Attorney, Agent, or Firm*—Fish & Richardson P.C.

(57) ABSTRACT

Whispering gallery mode optical resonators which have spatially-graded refractive indices. In one implementation, the refractive index spatially increases with a distance from an exterior surface of such a resonator towards an interior of the resonator to produce substantially equal spectral separations for different whispering gallery modes. An optical coupler may be used with such a resonator to provide proper optical coupling.

50 Claims, 6 Drawing Sheets

GRADED-INDEX WHISPERING GALLERY MODE RESONATORS

This application claims the benefit of U.S. Provisional Application No. 60/381,622 filed on May 17, 2002, the entire disclosure of which is incorporated herein by reference as part of this application.

STATEMENT REGARDING FEDERALLY SPONSORED RESEARCH

The systems and techniques described herein were made in the performance of work under a NASA contract, and are subject to the provisions of Public Law 96-517 (35 USC 202) in which the Contractor has elected to retain title.

BACKGROUND

This application relates to optical resonators, and more specifically, to optical whispering-gallery-mode ("WGM") resonators.

A dielectric material may be shaped to form an optical whispering-gallery-mode ("WGM") resonator which supports a special set of resonator modes known as whispering gallery ("WG") modes. These modes represent optical fields confined in an interior region close to the surface of the resonator due to the total internal reflection at the boundary. Microspheres with diameters from few tens to several hundred microns have been used to form compact optical WGM resonators. Such spherical resonators include at least a portion of the sphere that comprises the sphere's equator. The resonator dimension is generally much larger than the wavelength of light so that the optical loss due to the finite curvature of the resonators is small. As a result, a high quality factor, Q, may be achieved in such resonators. Some microspheres with sub-millimeter dimensions have been demonstrated to exhibit very high quality factors for light waves, exceeding $10^9$ for quartz microspheres. Hence, optical energy, once coupled into a whispering gallery mode, can circulate within the WGM resonator with a long photon life time.

SUMMARY

This application includes implementations of optical WGM resonators which have a spatially graded refractive index. In one implementation, the refractive index may have a spatially graded profile to extend the confinement area of the whispering gallery modes deeper inside the volume from the exterior surface of such a resonator than a WGM resonator with a spatially uniform index profile. The graded refractive index may spatially increase with a distance from an exterior surface of the resonator towards an interior of the resonator to produce substantially equal spectral separations for different whispering gallery modes. The spatially graded index profile may be, for example, a linear or nonlinear spatial function.

Such a spatially graded index profile allows for an optical coupler to be placed in direct contact with the exterior surface of the resonator without a gap to evanescently couple light into a whispering gallery mode of the resonator. Such a direct contact may be a full contact between the coupling surface of the optical coupler and the exterior surface of the resonator and may provide efficient coupling without strong loading of the initial Q factor.

In another implementation, the refractive index may spatially decrease with a distance from an exterior surface of the resonator towards an interior of the resonator to for certain applications such as optical sensing.

These and other implementations are now described in greater details as follows.

DETAILED DESCRIPTION

WGM resonators are usually formed of dielectric materials with a spatially uniform refractive index. Microsphere resonators with uniform refractive indices have been demonstrated to have a high Q factor greater than 1000 and up to $10^9$. Such high Q values are generally difficult and expensive to obtain in conventional Fabry-Perot optical resonators formed with mirrors. The capability of producing high Q values makes the WGM resonators useful for many optical applications, including optical filtering, optical delay, optical sensing, lasers, and opto-electronic oscillators. However, WGM resonators with uniform refractive indices have complex spectral pattern with unequal mode spacings and a high spectral density. Hence, in comparison with conventional Fabry-Perot resonators, these spectral characteristics of the WGM resonators with uniform refractive indices may potentially limit the performance or the range of applications using such WGM resonators.

Spherical WGM microcavities (microspheres) with uniform refractive indices, for example, are overmoded with complex quasi-periodic spectra and unequal mode spacings caused by, e.g., the material dispersion and the resonator dispersion. A highly oblate spheroidal microresonator (microtorus) may be used to significantly reduce the mode spectral density but it is technically difficult, if not impossible, to achieve equal mode spacings for different WG modes in spheroidal cavities with uniform refractive indices.

In WGM resonators with uniform resonator materials, the resonator dispersion increases as the resonator size decreases. This increased resonator dispersion in turn causes the unequal spectral separation between adjacent modes to increase. This undesired feature is rooted in the fact that the radial distribution of whispering-gallery resonant modes is dependent on the frequency of light in the WG modes. Higher frequency modes propagate on paths that are slightly closer to the surface than those of lower-frequency modes. Thus higher-frequency modes travel in trajectories of a slightly larger radius and slightly longer optical path lengths.

Optical path length of a mode by definition is a function of both the physical distance and the refractive index in the physical path of light. The designs of the WGM resonators in this application use a graded refractive index to modify both the refractive index and the physical location of a WG mode to produce optical spectra of WG modes that are different from the optical spectra produced by WGM resonators with uniform refractive indices. The graded refractive index is specially designed in order to produce mode spacings that are equal or substantially equal for different WG modes. In addition, the graded refractive index of such a WGM resonator may be designed to change the spatial confinement of the WG modes by shifting the spatial distribution of each WG mode away from the exterior surface of the resonator towards the interior of the resonator. Accordingly, the mode volumes of WG modes are increased and displaced away from the exterior surface of the resonator. This spatial shift in the mode location may be used to reduce the overall optical loss at the exterior surface caused by adverse effects of surface contamination and roughness and to achieve a high Q value closer to the high Q value of the resonator under ideal conditions. Furthermore, with the modal field being displaced deeper into the interior of the resonator, optimal coupling with an evanescent coupler, such as a prism or an angled-fiber tip, may be achieved by direct physical contact of the coupler with the resonator. This direct contact avoids the technical difficulties associated with maintaining the airgap between the coupler and a WGM resonator made of a dielectric material with a spatially uniform index profile.

The performance and range of applications based on WGM microcavities can be significantly expanded if a method is found to make microresonator modes equally spaced with precision corresponding to a fraction of the resonance bandwidth of a WGM resonator. Such a dielectric microresonator with an equidistant mode spectrum is similar to the spectrum of a typical Fabry-Perot resonator formed with two reflective mirrors. Such dielectric resonators with an equidistant spectrum may be used, for example, in frequency comb generators, optical pulse generators, broadband energy-storage circuits of electro-optical devices, and in other applications where conventional optical Fabry-Perot cavities are utilized.

Figure 1:
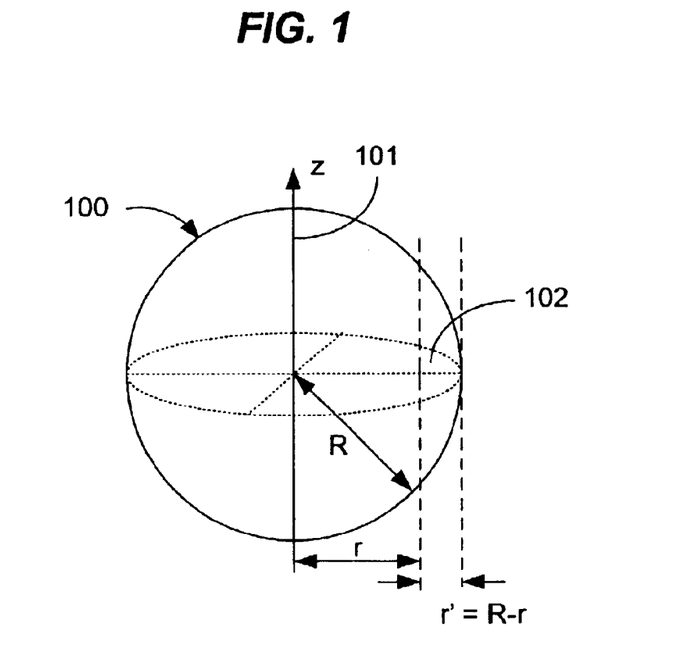
FIGS. 1, 2, 3, 4A, and 4B illustrate various exemplary resonator configurations with graded refractive indices that support whispering gallery modes.
Figure 2:
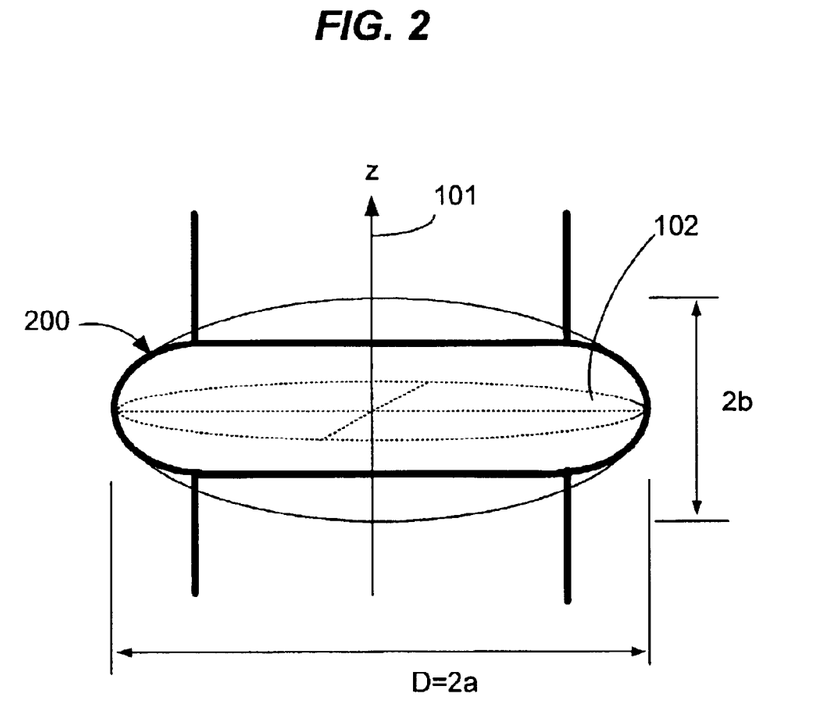
Figure 3:
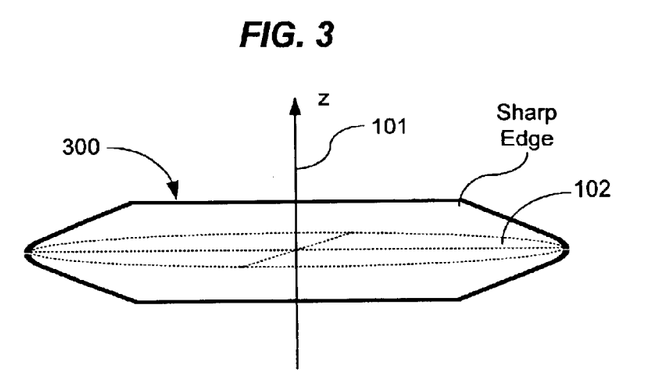

FIGS. 1, 2, and 3 illustrate three exemplary geometries for implementing the WGM resonators with graded indices of this application. FIG. 1 shows a spherical WGM resonator 100 which is a solid dielectric sphere with a graded index that changes spatially with the location within the sphere. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200 with a graded refractive index. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101(z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
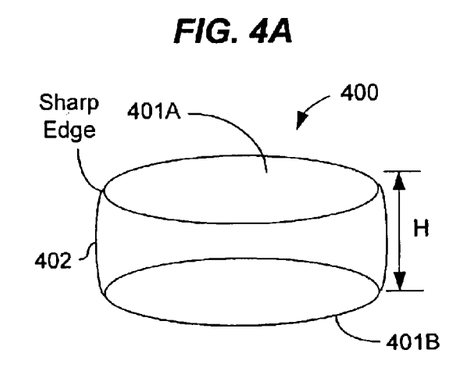
Figure 4B:
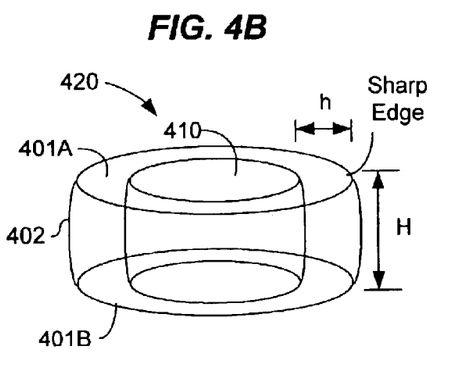

FIGS. 4A and 4B show a disk-shaped WGM resonator 400 and a ring-shaped WGM resonator 420, respectively, with graded refractive indices. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

Figure 5A:
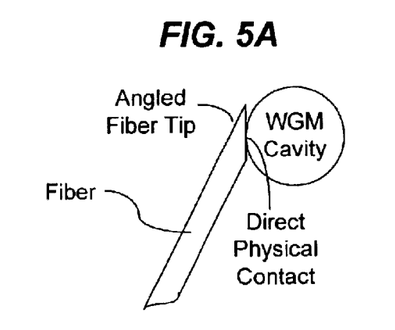
FIGS. 5A and 5B illustrate two direct-contact evanescent coupling examples.
Figure 5B:
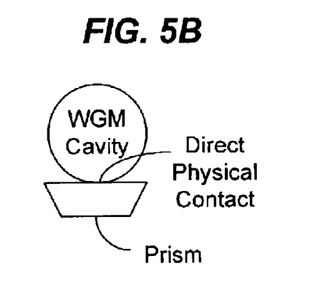

In general, an optical coupler is needed to couple optical energy into or out of the WGM resonator by evanescent coupling. FIGS. 5A and 5B show two exemplary optical couplers engaged to a WGM resonator with a graded index according to this application. As described later in this application, the graded index may be selected to shift the WC modes away from the exterior surface of the WGM resonator. Hence, the optical coupler may be in direct contact with the exterior surface of the resonator to effectuate the desired critical coupling under the proper mode-matching condition. FIG. 5A shows an angle-polished fiber tip is in contact with the WGM resonator with a graded index. FIG. 5B shows a micro prism is in contact with the WGM resonator with a graded index. Other evanescent couplers such as a coupler formed from a photonic bandgap is material may be used. Notably, in WGM resonators with uniform indices, a part of the electromagnetic field of the WG modes is located at the exterior surface of the resonators. A gap between the optical coupler and the WGM resonator with a uniform index is generally needed to achieve a proper optical coupling.

This gap is used to properly "unload" the WG mode. The Q-factor of a WG mode is determined by properties of the dielectric material of the WGM resonator, the shape of the resonator, the external conditions, and strength of the coupling through the coupler (e.g. prism). The highest Q-factor may be achieved when all the parameters are properly balanced to achieve a critical coupling condition. In WGM resonators with uniform indices, if the coupler such as a prism touches the exterior surface of the resonator, the coupling is strong and this loading can render the Q factor to be small. Hence, the gap between the surface and the coupler is used to reduce the coupling and to increase the Q factor. In general, this gap is very small, e.g., less than one wavelength of the light to be coupled into a WG mode.

This requirement of a gap can be problematic in device design and manufacture because the gap must be maintained at a critical angle and with a critical distance. The WGM resonators with graded indices may be designed with a spatial gradient profile for the refractive index to shift the WG modes away from the exterior surface towards the interior of the resonator so that the optical coupler in direct contact with the exterior surface can be used to achieve the critical coupling condition without the airgap. In addition, this shift of the WG modes can also reduce optical loss caused by the scattering and absorption by the imperfections and contaminants on the exterior surface of the resonator. This reduced loss leads to high values in the Q factor.

Referring back to FIGS. 1, 2, 3, 4A, and 4B, the graded index profile for the WGM resonators, like the geometrical shapes of the resonators, may also have axially or cylindrically symmetric spatial profiles with respect to the same axis $101(z)$. According to one implementation, the graded index profile of such a WGM resonator should at least vary along the radial direction, i.e., $n=n(r)$ where $r=(x^2+y^2)^{1/2}$. This radial profile $n(r)$ may have different configurations. In one configuration, for example, the index changes with r throughout the entire resonator from the most inner part where r is at its minimum to the exterior surface where r is at its maximum at each given z within the resonator. The graded index is used here to modify the WG modes and thus it may suffice to have the graded profile only at the outer portion of the resonator because the WG modes are centered near the exterior surface of the resonator. Therefore, in another exemplary configuration, the index may be set at a predetermined constant $n_o$ along the is radial direction at the inner part of the resonator but have a radial variation at the outer part of the resonator: $n=n_o+n_r(r)$, where $n_r(r)=0$ when $r<r_o$ and varies with r when $r \geq r_o$. The $r_o$ and the gradient function $n_r(r)$ are selected to place the center of each WG mode where the mode strength is maximum at a desired location away from the exterior surface.

In general, the graded index $n(r)$ or the gradient portion $nr(r)$ decreases as r increases in order to place the center of each WG mode away from the exterior surface of the resonator. In other applications such as sensing based on WGM resonators, the graded index $n(r)$ or the gradient portion $n_r(r)$ increases as r increases.

The following sections describe graded index profiles for WGM resonators with a spherical exterior surface to illustrate the effects of the graded index along the radial direction. The detailed analysis based on the Maxwell wave equation is included in "Dispersion Compensation in Whipering-Gallery Modes," Ilchenko et al., Journal of Optical Society of America, Volume 20(1), pages 157–162 (2003). It is understood that specific graded index profiles may be designed for the spheroid and other conic resonators to achieve desired spatial profile for each WG mode. In general, the graded index may be a spatial linear or nonlinear function.

For simplicity of the analysis, it is assumed in the following sections that the dielectric constant of the graded resonator material is $$\epsilon(r)=\epsilon_o+\epsilon'(R-r),$$

where R is the radius of the sphere from which the spherical WGM resonator is formed. Referring to FIG. 1, $r'=R-r$. The ratio between $\epsilon_o$ and $\epsilon'$ may be chosen in an appropriate way to suppress the mode dispersion significantly. It is further assumed that R is much greater than the wavelength $\lambda$ of light for the WG modes. This assumption is applicable in most practical micro resonators. For the angular momentum number v much greater than 1, almost all energy of a WG mode is spatially confined within a layer with a thickness of about $Rv^{-2/3}$. Under the above conditions, the approximate number of equidistant modes for the resonator is $$N \approx 1.2 \frac{v^{8/3}}{Q}\left(1-\frac{R}{2}\frac{\epsilon^1}{\epsilon_0}\right)^{-2/3}.$$

Figure 6:
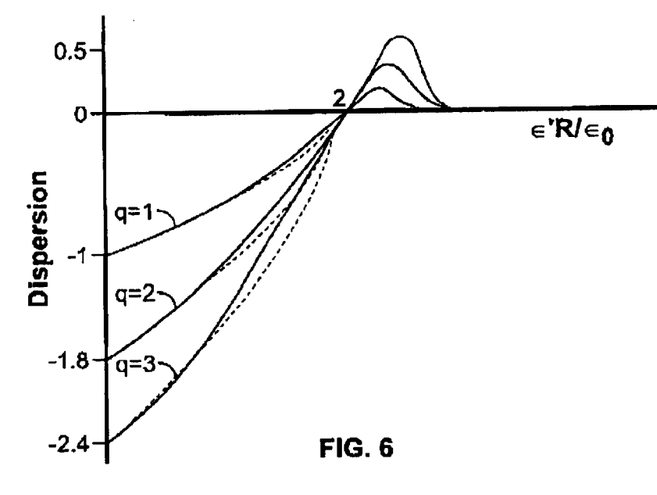
FIGS. 6, 7, 8, 9, and 10 show simulation results of whispering gallery mode resonators with graded refractive indices.

Hence, if $\epsilon'$ approaches $2\epsilon_o/R$, the resonator has equidistant mode spacings for all modes. FIG. 6 shows the resonator dispersions of three adjacent WG modes as a function of $\epsilon'R/\epsilon_o$ based on numerical computations. The numerical analysis confirms that the resonator dispersions for different WG modes are is substantially eliminated and thus an equidistance spectrum can be achieved for different WG modes.

In one implementation, the gradient profile $\epsilon(r)$ may be a linear function of $r'=R-r$. This is described in the U.S. Provisional Application No. 60/381,622 filed on May 17, 2002. Under the first-order approximation, the linear gradient profile for the a micro sphere cavity to have equidistant frequency spectrum may be:

$$\epsilon(r')=\epsilon(R)+2\frac{\epsilon(R)}{(R)}r'.$$

This linear gradient index corresponds to evenly-spaced resonator frequencies represented by the following:

$$k_i = m\frac{1}{R\sqrt{\epsilon(R)}},$$

where m is an integer.

Figure 7:
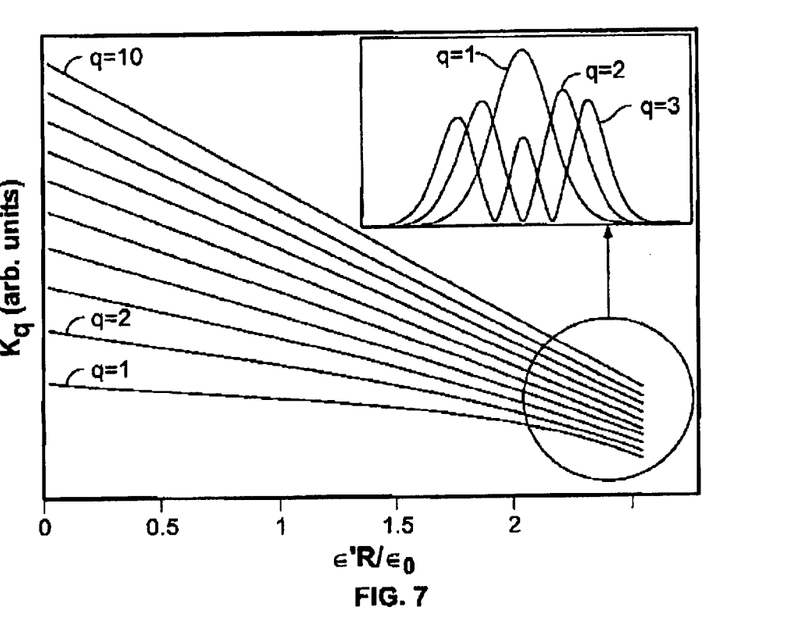

Notably, a graded material WGM resonator also demonstrates radial dispersion compensation except for v-dispersion compensation. This may be because modes do not encounter the resonator boundaries for large refractive-index gradients but only the potential dip created owing to the gradient. As a consequence, radial profiles of cavity modes are nearly symmetrical, much in the same way as harmonic-oscillator wave functions. FIG. 7 shows dependence of wave-vector eigen values $k_{q,v}$ on a normalized gradient of the dielectric constant for v=600. WG modes with different q become closer as the gradient increases. The WC modes pushed far away from the resonator boundary at the exterior surface are nearly equidistant in frequency. The insert figure in FIG. 7 shows amplitude profiles for the fields for large index gradients where the mode wave functions are shown to be nearly symmetric.

Figure 8:
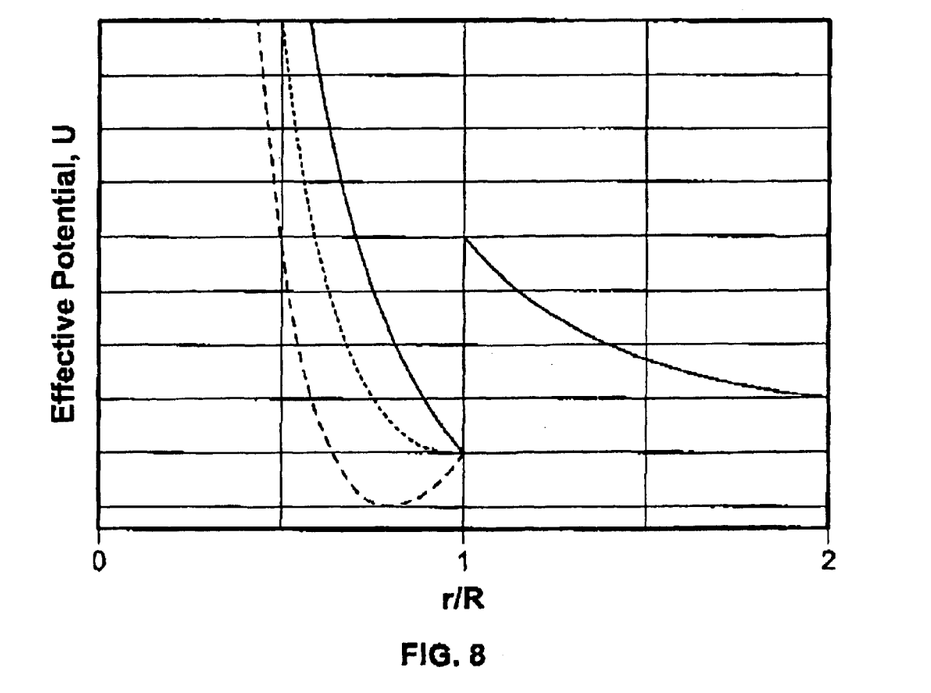

The above result may be understood from a complex-angular momentum theory described in "Theory of Mie resonances and ripple fluctuations," by Guimaraes et al., Opt. Communications, Volume 89, pages 363–369 (1992) where an analogy between optics and mechanics is utilized and the cavity modes are described as eigen values of an effective potential U. This effective potential for the WGM resonators is asymmetric when $\epsilon$ does not depend on radius r inside the sphere. FIG. 8 illustrates this by the curve in solid line. In spheres possessing gradient dielectric susceptibilities increasing to the sphere center, the potential pocket broadens, shifts into the cavity, and becomes more symmetric as illustrated by the curves in dashed lines. The minimum of the effective potential is still on the sphere surface. For the critical value of the susceptibility gradient, the potential resembles one half of the oscillatory potential $U \sim (r-R)^2|_{r->R-0}$ (short-dashed curve in FIG. 8). For the gradients beyond the critical value, the minimum of the potential moves towards the interior of the resonator. The deeper the minimum of the potential is, the better it can be described by the oscillatory potential (FIG. 8, long-dashed curve).

Figure 9:
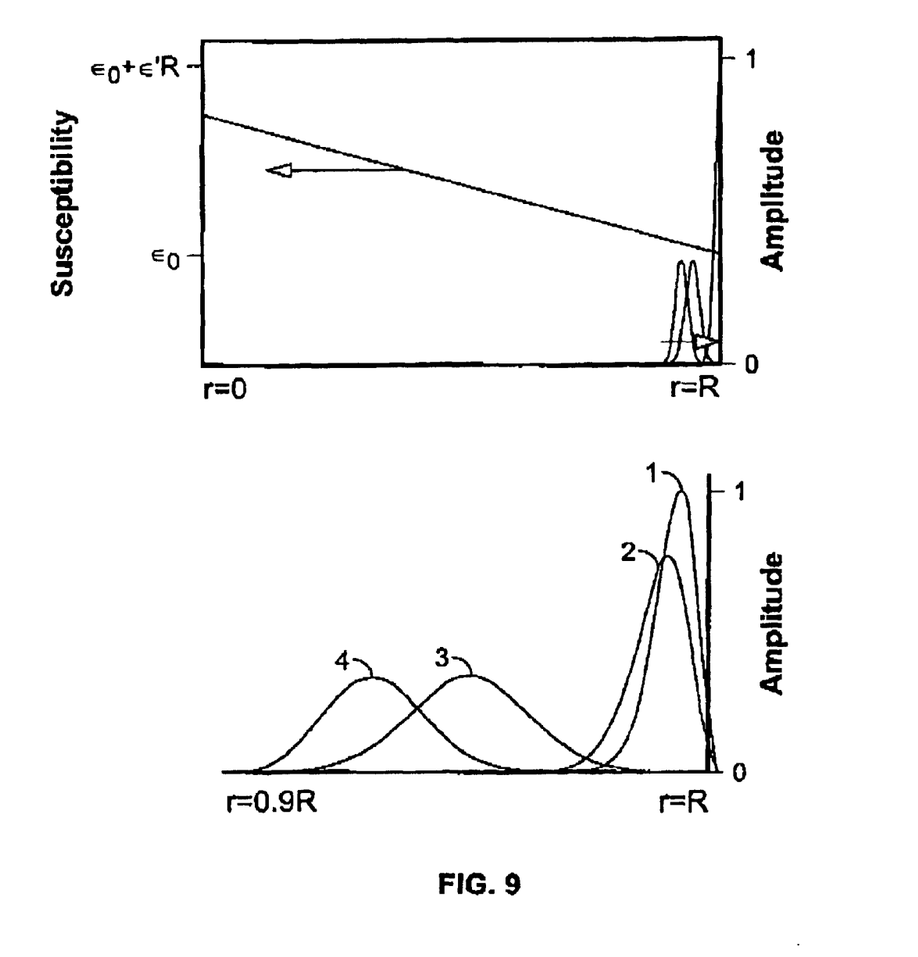

The gradient in the index of refraction can affect the field distribution in the WGM resonator. FIG. 9 shows the radial dependencies of the susceptibility of a cavity material as well as of the amplitude profiles of the field (q=1) inside a spherical WGM resonator with a graded index represented by $\epsilon'$. The top chart in FIG. 9 shows the real scale for the field distributions in the case of $\nu$=600. The amplitude distribution as a function of r shows that the fields are localized close to the cavity surface (r=R). The bottom chart shows more detailed amplitude distributions under four different conditions. Curve (1) of the bottom plot corresponds to $\epsilon'R/\epsilon_o$=0, curve (2) to $\epsilon'R/\epsilon_o$=1, curve (3) to $\epsilon'R/\epsilon_o$=2, and curve (4) to $\epsilon'R/\epsilon_o$=2.4. As the value of $\epsilon'$ increases, the WG modes are shifted deeper into the resonator and away from the exterior surface.

This effect of the graded index may be used to greatly reduce the losses caused by surface defects such as dust or scratches. The change of the mode geometry may also change cavity radiative losses which may be much smaller than the losses due to surface scattering.

Moreover, an efficient coupling with WGMs under the critical coupling condition to obtain high Q factors may be achieved by a prism or fiber coupler that is in physical contact with the dielectric cavity. This may significantly simplify usage of WGM cavities in various applications. When improperly implemented, such a contact may overload the modes of the WGM dielectric cavity and thus may lead to a significant broadening of the resonances. Such undesired effects may be avoided or significantly reduced by properly engineering the profile of the dielectric susceptibility gradient so that the evanescent field of the cavity may be reduced to allow for the desired mode-matching evanescent coupling while greatly suppressing the influence of the surface contamination.

In general, the quality factor Q of a WG mode in the WGM resonator is primarily determined by three effects: absorption in the dielectric material ($Q_m$), surface scattering losses ($Q_{ss}$) and loading by the external coupler ($Q_l$). The load quality factor $Q_l$ can be regulated from the coupler outside the WGM resonator. In the example of a prism coupler as shown in FIG. 5B, the load quality factor $Q_l$ depends on the distance, d, from the coupling prism to the sphere surface as follows:

$$Q_l \sim \exp\left(\frac{4\pi\sqrt{\varepsilon_0-1}}{\lambda}\right),$$

where $\lambda$ is the wavelength of a WG mode. The critical (optimum) coupling with the WG mode is achieved if d is chosen such that $Q_l = (1/Q_{ss}+1/Q_m)^{-1}$. Because usually $Q_m >> Q_{ss}$, the effects of the absorption of the material can be neglected in most cases.

Both $Q_{ss}$ and $Q_l$ are proportional to the ratio of the field power on the surface of the cavity and the total energy of the mode. The lost power caused by the surface scattering is given by:

$$P_{ss}=\beta E(r=R)^2,$$

and the lost power caused by the evanescent coupler is $$P_l=\alpha E(r=R)^2.$$

In the above equations, the factor $\alpha$ is a geometrical factor that depends on the shape and the dielectric constants of a coupler and a thin surface layer within the WGM resonator in which the WGM is localized and on the distance between the coupler and the cavity surface. The factor $\beta$ depends on the geometry of the surface inhomogeneities and their optical parameters. E(r=R) is the amplitude of the electric field on the cavity surface.

Based on the above, the quality factor of the WGM resonator may be determined as $Q_{l,ss}=W/(P_{l,ss}T)$, where W is the energy stored in the WG mode and T is the oscillation period. By changing the profile of the index of refraction $\epsilon(r)$, the ratio $W/E(r=R)^2$ can be changed. The ratio of $Q_l/Q_{ss}$, however, stays unchanged. Therefore, by choosing $Q_l/Q_{ss}=\frac{1}{2}$, and -reducing the absorption that is due to the surface scattering via engineering a cavity index of refraction such that $Q_{ss}=Q_m$, it is possible to achieve both the critical coupling and the maximum index of refraction. It can be shown that the maximum achievable quality factors for silica microspheres are approximately $Q_m=10^{12}$.

It is convenient to use a simple ratio to estimate the increase of the quality factors with the index gradient. Consider two identical spherical microcavities where the susceptibility of one cavity is constant $\epsilon_o$ and the susceptibility of the other cavity has a spatial gradient $\epsilon(r)[\epsilon(R)=\epsilon_o]$. The ratio of the quality factors of the two cavities is:

$$\frac{Q_l}{\tilde{Q}_l} \approx \frac{Q_{ss}}{\tilde{Q}_{ss}} \approx \frac{\psi^2(r=R)}{\int_0^R \psi^2(r)dr} \frac{R(\varepsilon_0-1)}{2\varepsilon_0},$$

where $Q_l$ and $Q_{ss}$ ($\tilde{Q}_l$ and $\tilde{Q}_{ss}$) are the quality factors that are due to loading and surface scattering for the cavity with constant (graded) susceptibility and $\psi(r) \sim E(r)$ is the field distribution of a TE WG mode of the cavity with the graded index. The less that the field is on the surface of the dielectric cavity $\psi(r=R)$ (the deeper is the mode localization), the less are the absorption and coupling and the higher the quality factors.

Figure 10:
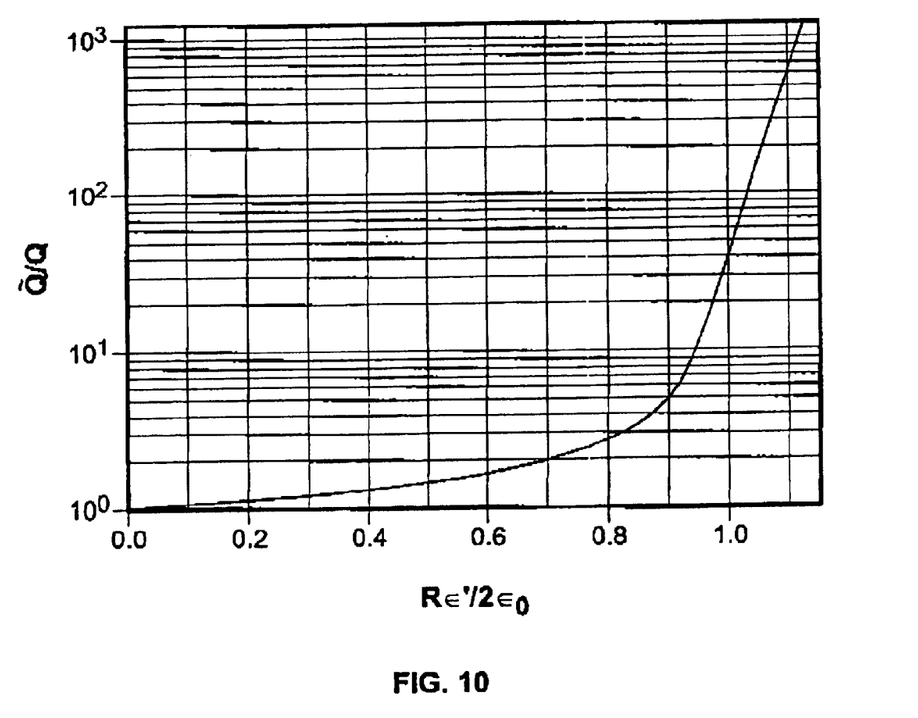

FIG. 10 is a chart showing the dependence of the ratio as a function of the normalized gradient dielectric susceptibility. The radius of the sphere cavities is R=4 mm, the constant susceptibility $\epsilon_o$=2.1, and the mode wavelength is $\lambda$=1.55 micron.

When a coupling prism is in full contact with the dielectric cavity (d=0) as shown in FIG. 5B, the coupling losses exceed the surface scattering losses in this case. The value of $Q_l$ may be increased by changing the gradient $\epsilon(r)$ until the bulk optical losses become equal to the coupling losses. At this point, the critical coupling can be achieved at a much higher Q-factor level.

It is worth noting here that in some cases it may be desirable to increase the evanescent field of a dielectric cavity at the exterior surface. One example is if the cavity is intended to be used as an optical sensor where the exterior surface is the sensing surface to detect a change in its surroundings. Such a WGM resonator sensor may also be optimized via manipulation of $\epsilon(r)$ dependence. It has been shown that WGMs tend to be closer to the cavity exterior surface if the index of refraction of the cavity close to its exterior surface exceeds the internal index of refraction. Such dependence of the refractive index may increase the surface absorption, but it can also increase the coupling to the external space. Hence, for sensing applications, the graded index should increase, rather than decrease, with the radius r. This spatial profile pushes the WG modes outward in order to increase the detection sensitivity for sensing applications. The optical losses at the surface may be mitigated by reducing the surface imperfections.

Graded index materials have been widely used in lenses and fibers. Such materials may be used to fabricate WGM resonators by, e.g., using mechanical and flame polishing techniques. Other suitable techniques may also be used to produce the desired gradient indices in WGM resonators.

In summary, only a few implementations are disclosed. However, it is understood that variations and enhancements may be made.

What is claimed is:

1. A device, comprising:
an optical resonator formed of a dielectric material to support whispering gallery modes and configured to have a spatially graded refractive index, wherein said resonator is cylindrically symmetric in shape, and said refractive index spatially increases along a radial direction.

2. The device as in claim 1, wherein said optical resonator includes at least a portion of a sphere.

3. The device as in claim 1, wherein said optical resonator has a non-spherical shape.

4. The device as in claim 3, wherein said optical resonator has a spheriodal shape.

5. The device as in claim 1, wherein said optical resonator has a disk shape.

6. The device as in claim 1, wherein said optical resonator has a ring shape.

7. The device as in claim 1, wherein said spatially graded refractive index has a nonlinear spatial profile.

8. The device as in claim 1, further comprising an optical coupler positioned relative to said resonator to evanescently couple light into at least one of said whispering gallery modes.

9. The device as in claim 1, further comprising an optical coupler in contact with an exterior surface of said resonator to evanescently couple light into at least one of said whispering gallery modes.

10. The device as in claim 1, wherein said spatially graded refractive index has a linear spatial profile.

11. A device, comprising;
an optical resonator formed of a dielectric material to support whispering gallery modes and configured to have a spatially graded refractive index,
wherein said refractive index spatially decreases with a distance from an exterior surface of said resonator towards an interior of said resonator.

12. The device as in claim 11, wherein said refractive index has a spatially graded profile to substantially confine said whispering gallery modes within said exterior surface.

13. The device as in claim 11, further comprising an optical coupler in contact with said exterior surface to evanescently couple light into at least one of said whispering gallery modes.

14. The device as in claim 11, wherein said spatially graded refractive index has a linear spatial profile.

15. The device as in claim 11, wherein said spatially graded refractive index has a nonlinear spatial profile.

16. The device as in claim 11, further comprising an optical coupler positioned relative to said resonator to evanescently couple light into at least one of said whispering gallery modes.

17. The device as in claim 11, wherein said optical resonator includes at least a portion of a sphere.

18. The device as in claim 11, wherein said optical resonator has a non-spherical shape.

19. A device, comprising:
an optical resonator formed of a dielectric material to support whispering gallery modes and configured to have a spatially graded refractive index,
wherein said refractive index has a spatially graded profile to substantially equalize optical path lengths of different whispering gallery modes in said resonator.

20. The device as in claim 19, wherein said optical resonator includes at least a portion of a sphere.

21. The device as in claim 19, wherein said optical resonator has a non-spherical shape.

22. The device as in claim 21, wherein said optical resonator has a spheriodal shape.

23. The device as in claim 19, wherein said optical resonator has a disk shape.

24. The device as in claim 19, wherein said optical resonator has a ring shape.

25. A device comprising:
an optical resonator formed of a dielectric material to support whispering gallery modes and configured to have a spatially graded refractive index,
wherein said spatially graded refractive index includes a constant index portion in an interior of said optical resonator and a spatial-varying portion near the exterior surface of said optical resonator.

26. The device as in claim 25, wherein said spatially-varying portion has a linear spatial profile.

27. The device as in claim 25, wherein said spatially-varying portion has a nonlinear spatial profile.

28. The device as in claim 25, wherein said resonator is cylindrically symmetric in shape, and a value of said spatially-varying portion decreases along a radial direction.

29. The device as in claim 25, wherein a value of said spatially-varying portion decreases along a radial direction.

30. The device as in claim 25, wherein a value of said spatially-varying portion spatially decreases with a distance from an exterior surface of said resonator towards an interior of said resonator.

31. The device as in claim 25, wherein a value of said spatially-varying portion spatially increases with a distance from an exterior surface of said resonator towards an interior of said resonator, and the device further comprising an optical coupler in contact with an exterior surface of said resonator to evanescently couple light into at least one of said whispering gallery modes.

32. The device as in claim 25, wherein said optical resonator includes at least a portion of a sphere.

33. The device as in claim 25, wherein said optical resonator has a non-spherical shape.

34. The device as in claim 33, wherein said optical resonator has a spheriodal shape.

35. The device as in claim 25, wherein said optical resonator has a disk shape.

36. The device as in claim 25, wherein said optical resonator has a ring shape.

37. A device, comprising:
an optical resonator foamed of a dielectric material to support whispering gallery modes and configured to have a spatially graded refractive index,
wherein said spatially graded refractive index has a linear spatial profile.

38. The device as in claim 37, wherein said spatially graded refractive index decreases with a distance from an exterior surface of said resonator towards an interior of said resonator.

39. The device as in claim 37, wherein said spatially graded refractive index increases with a distance from an exterior surface of said resonator towards an interior of said resonator.

40. The device as in claim 37, wherein said optical resonator includes at least a portion of a sphere.

41. The device as in claim 37, wherein said optical resonator has a non-spherical shape.

42. The device as in claim 37, wherein said optical resonator has a disk shape.

43. The device as in claim 37, wherein said optical resonator has a ring shape.

44. A device, comprising:
- an optical resonator formed of a dielectric material in a cylindrically symmetric shape to support whispering gallery modes, said resonator having a refractive index with a spatial-varying profile along a radial direction of said resonator,
- wherein said spatial-varying profile is configured to produce substantially equal optical path lengths for different whispering gallery modes in said resonator.

45. The device as in claim 44, further comprising an optical coupler in contact with said resonator to evanescently couple light into at least one of said whispering gallery modes.

46. The device as in claim 44, wherein said refractive index spatially increases with a distance from an exterior surface of said resonator towards an interior of said resonator.

47. The device as in claim 44, wherein said spatial-varying profile is configured to substantially confine said whispering gallery modes within an exterior surface of said resonator.

48. The device as in claim 44, wherein said optical resonator includes at least a portion of a sphere.

49. The device as in claim 44, wherein said optical resonator has a non-spherical shape.

50. The device as in claim 44, wherein said spatially graded refractive index includes a constant index portion in an interior of said optical resonator and a spatial-varying portion near the exterior surface of said optical resonator.

* * * * *